United States Patent
Marechal et al.

(10) Patent No.: US 6,688,691 B2
(45) Date of Patent: Feb. 10, 2004

(54) MULTIPLE POSITION SEAT FOR PLANE

(75) Inventors: Robert Marechal, Paris (FR); Guy Mercier, Neuvy-Pailloux (FR)

(73) Assignee: Societe Industrielle et Commerciale de Materiael Aeronautique, Issoudun (FR)

( * ) Notice: Subject to any disclaimer, the term of this patent is extended or adjusted under 35 U.S.C. 154(b) by 0 days.

(21) Appl. No.: 10/066,548

(22) Filed: Feb. 5, 2002

(65) Prior Publication Data
US 2002/0109385 A1 Aug. 15, 2002

(30) Foreign Application Priority Data
Feb. 5, 2001  (FR) .............................. 01 01506

(51) Int. Cl.$^7$ ................................. B60N 2/02
(52) U.S. Cl. .................. 297/317; 297/318; 297/354.13; 297/325; 297/84
(58) Field of Search ................. 297/316, 317, 297/318, 354.13, 325, 84

(56) References Cited

U.S. PATENT DOCUMENTS

| | | | | |
|---|---|---|---|---|
| 847,332 A | * | 3/1907 | Hart ........................... | 297/320 |
| 4,696,515 A | * | 9/1987 | Heesch ........................ | 297/374 |
| 5,044,647 A | * | 9/1991 | Patterson .................. | 280/250.1 |
| 5,857,745 A | * | 1/1999 | Matsumiya ............. | 297/354.13 |
| 5,954,401 A | * | 9/1999 | Koch et al. ............. | 297/354.13 |
| 5,992,798 A | * | 11/1999 | Ferry ....................... | 244/118.6 |
| 6,059,364 A | | 5/2000 | Dryburgh et al. | |
| 6,170,786 B1 | * | 1/2001 | Park et al. ................ | 248/274.1 |
| 6,209,956 B1 | * | 4/2001 | Dryburgh et al. ........... | 297/245 |
| 6,276,635 B1 | * | 8/2001 | Ferry et al. ............... | 244/118.6 |
| 6,305,644 B1 | * | 10/2001 | Beroth ..................... | 244/118.5 |
| 6,412,870 B1 | * | 7/2002 | Higgins et al. ............. | 297/342 |
| 6,494,536 B2 | * | 12/2002 | Plant ..................... | 297/284.11 |

FOREIGN PATENT DOCUMENTS

| | | |
|---|---|---|
| EP | 0 957 025 A2 | 11/1999 |
| EP | 0 980 826 A2 | 2/2000 |
| EP | 1 044 878 A2 | 10/2000 |
| GB | 2 295 962 A | 6/1996 |
| JP | 357147931 A * | 9/1982 |

\* cited by examiner

*Primary Examiner*—Peter M. Cuomo
*Assistant Examiner*—Joseph Edell
(74) *Attorney, Agent, or Firm*—Blank Rome, LLP

(57) ABSTRACT

The invention relates to a seat (1) for an aircraft comprising a squab (2), a backrest (3), a leg rest (4), a support structure (5) for the squab (2) and the backrest (3), and a fixed rear separation shell (13). The support structure (5) or the squab (2) moveable in translation in a direction substantially perpendicular to the backrest (3) in the vertical position. The seat (1) is situated in a space lying between a fixed front separation shell (12) and a fixed rear separation shell (13). The movements of each of the components (2, 3, 4) of the seat are independent of each other and the fixed separation shells (12, 13).

19 Claims, 7 Drawing Sheets

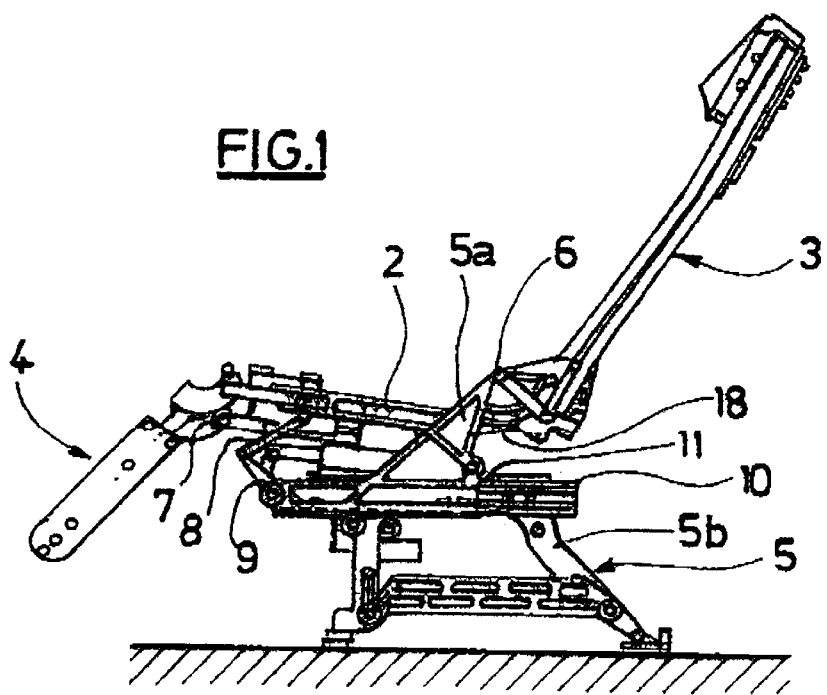
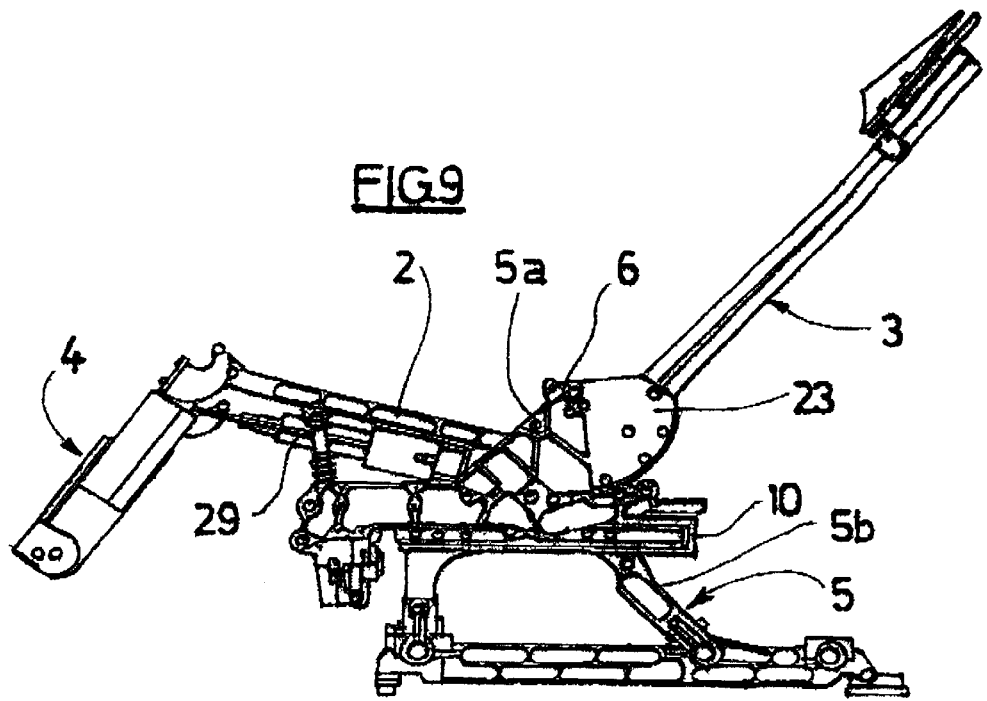

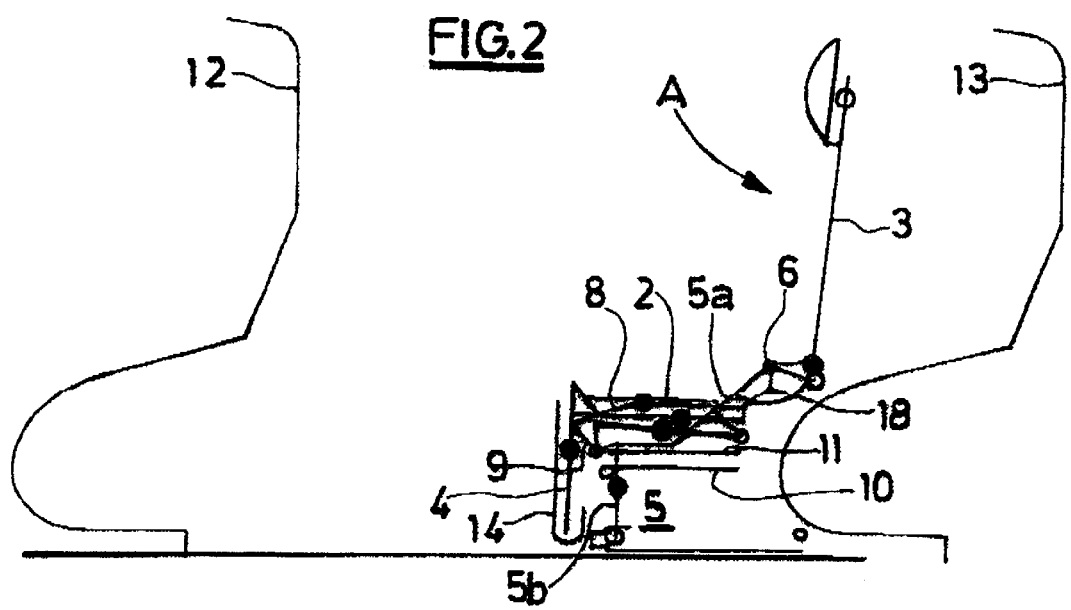
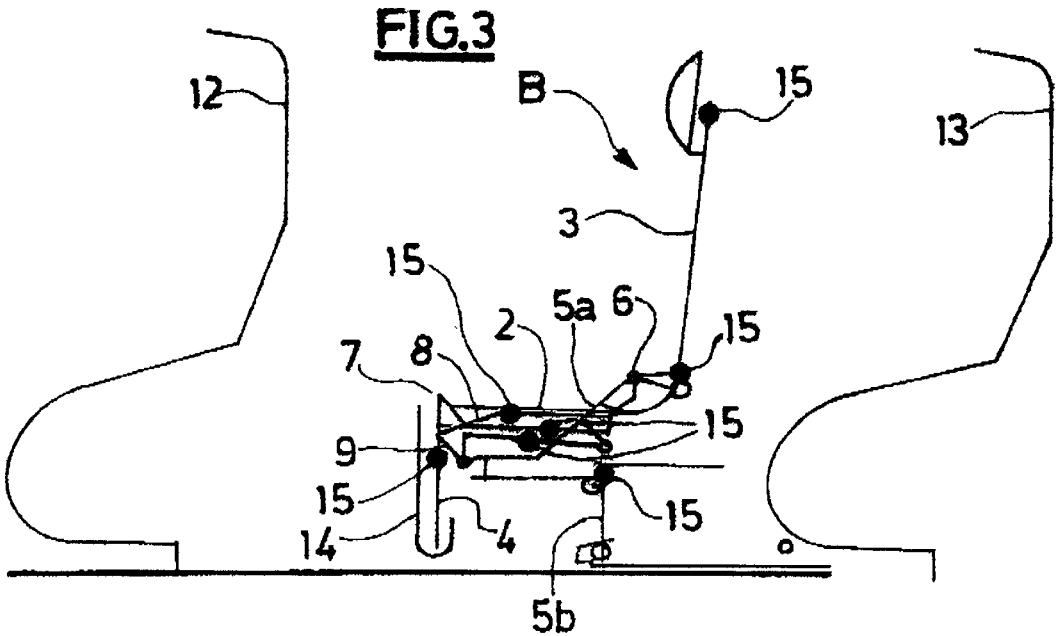

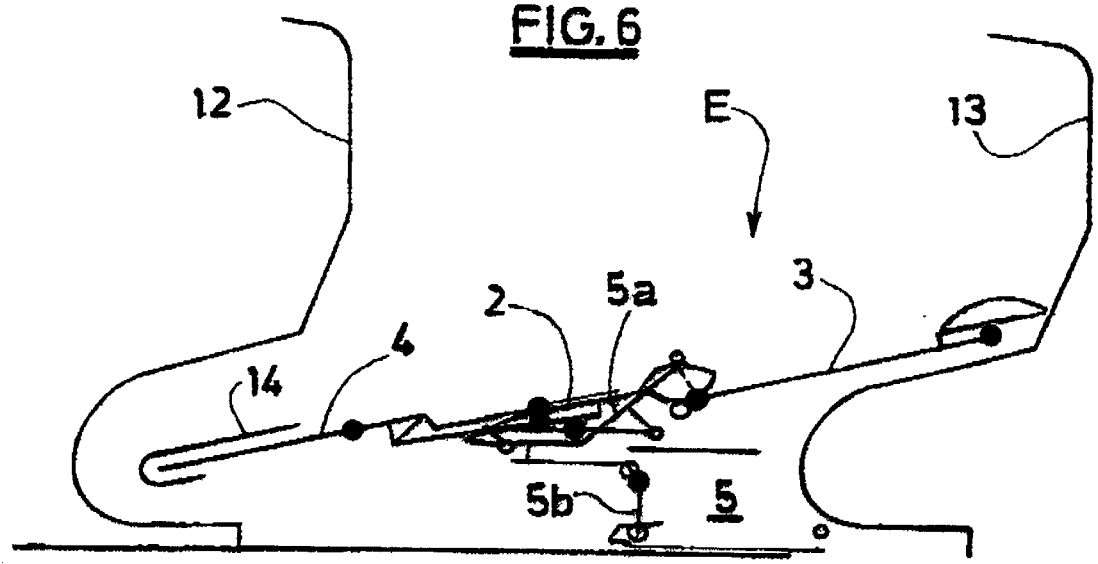
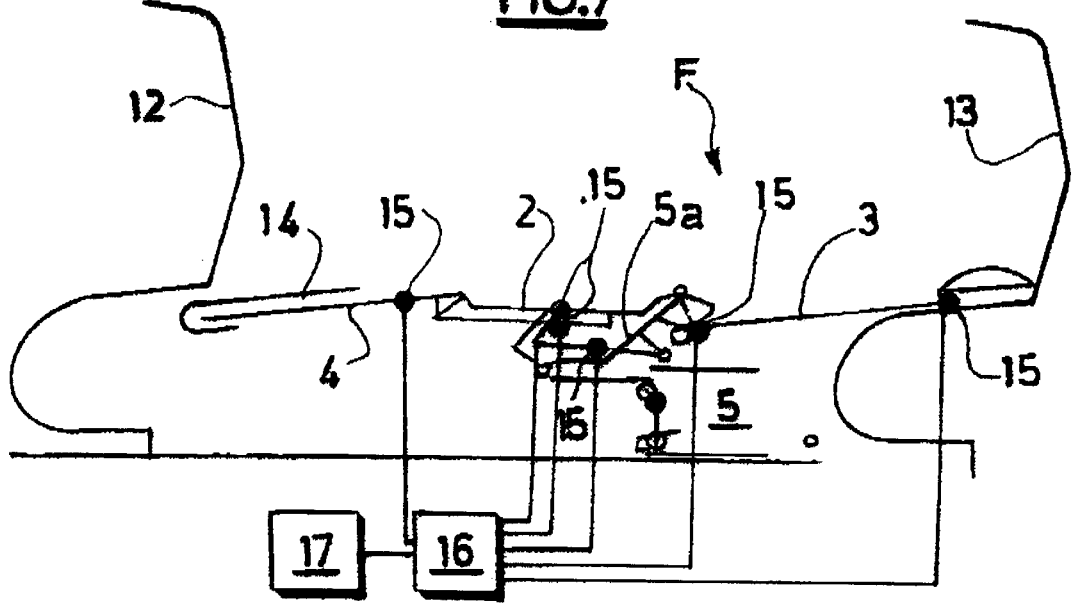

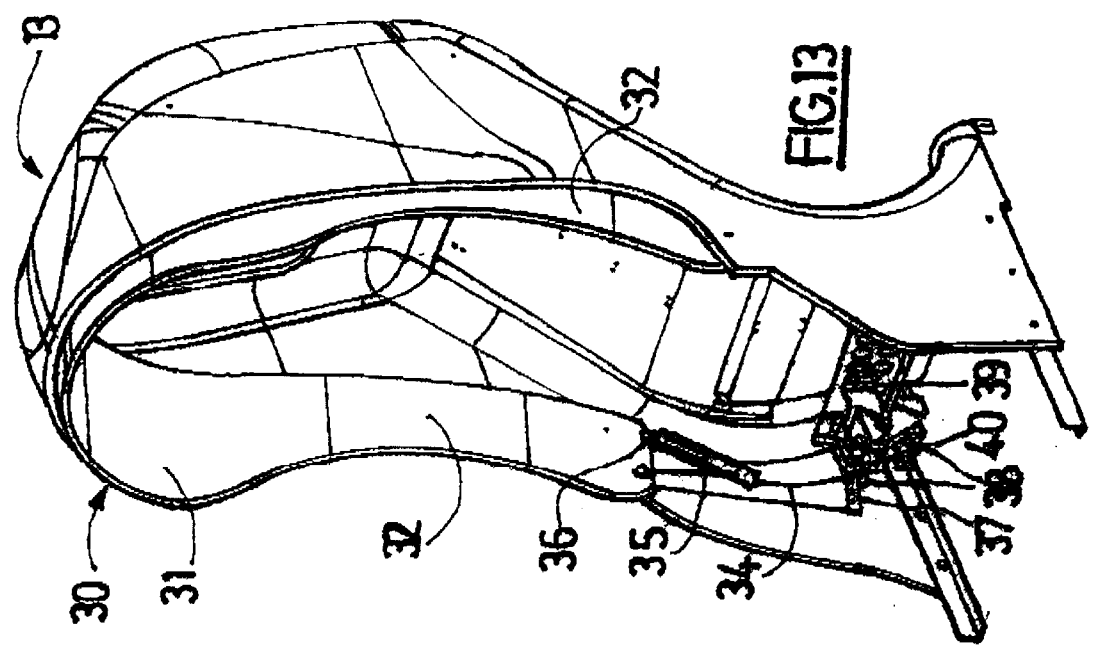
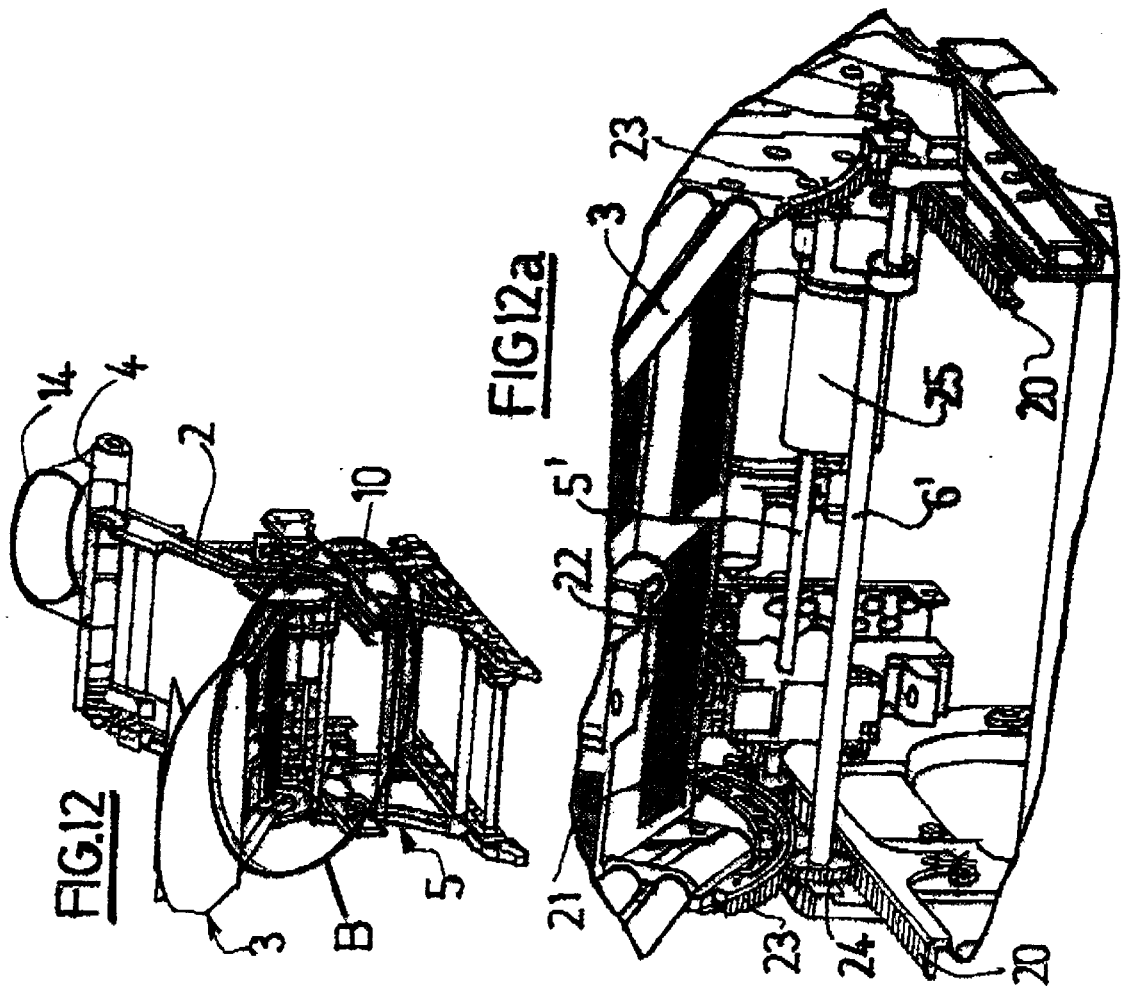

US 6,688,691 B2

MULTIPLE POSITION SEAT FOR PLANE

BACKGROUND OF THE INVENTION

The invention relates to a seat for an aircraft which can adopt all the positions allowed by a space between a fixed front separation shell and a fixed rear separation shell.

Documents are already known describing seats which can adopt several positions between two fixed separation shells, such as the documents EP 1 043 225, EP 1 044 878 and U.S. Pat. No. 6,059,364.

However, in these documents, the movements of the seat are linked to one of the separation shells, which limits the degrees of freedom of the seat. In particular, the latter cannot be moved away from the separation shell.

The document EP 980 826 describes a seat whose movements are independent of the separation shell. However, the latter is movable, which may be a nuisance to the passenger sitting behind the separation shell.

SUMMARY AND OBJECTS OF THE INVENTION

The object of the invention is to produce a seat extending between a fixed front separation shell and a fixed rear separation shell, able to adopt all the positions possible in the space thus defined.

For this purpose, the seat according to the invention comprises a squab adjustable for inclination, a backrest adjustable for inclination, a leg rest adjustable for inclination with respect to the squab, a structure for supporting the squab and backrest and a fixed separation shell disposed behind the seat backrest, the said support structure or the squab being able to move in translation in a direction substantially perpendicular to the plane of the said backrest in the vertical position, the said seat being situated in a space lying between a fixed front separation shell and the fixed rear separation shell, and the said seat extending close to the fixed rear separation shell in the straight take-off and landing position in which the squab is substantially horizontal, the backrest and the leg rest being substantially vertical.

This seat is characterised in that the movements of each of the components of the seat are independent of each other and of the said fixed separation shells, and in that it comprises control means enabling it to adopt, between the said straight take-off and landing position of the seat and an elongated position of the seat, all the positions allowed by the space lying between the said fixed front separation shell and the said fixed rear separation shell.

Other particularities and advantages of the invention will also emerge from the following description.

In the accompanying drawings, given by way of non-limitative examples:

BRIEF DESCRIPTION OF THE DRAWINGS

FIG. 1 is a side view of the seat according to the invention in an inclined position;

FIG. 2 is a schematic side representation of the seat in the straight take-off and landing position;

FIG. 3 is a schematic side representation of the seat in the straight position at a distance from the fixed rear separation shell;

FIG. 6 is a schematic side representation of the seat in an inclined elongated position;

FIG. 7 is a schematic side representation of the seat in a maximum-length completely horizontal elongated position;

FIG. 9 is a side view of the seat according to another embodiment of the invention;

FIG. 12 is a perspective view of the means of articulating the squab and backrest of the seat depicted in FIG. 9, FIG. 12a is an enlargement of part B in FIG. 12.

FIG. 13 is a perspective view of an embodiment of the fixed shell of the seat according to the invention.

DETAILED DESCRIPTION OF THE INVENTION

Figure 4:
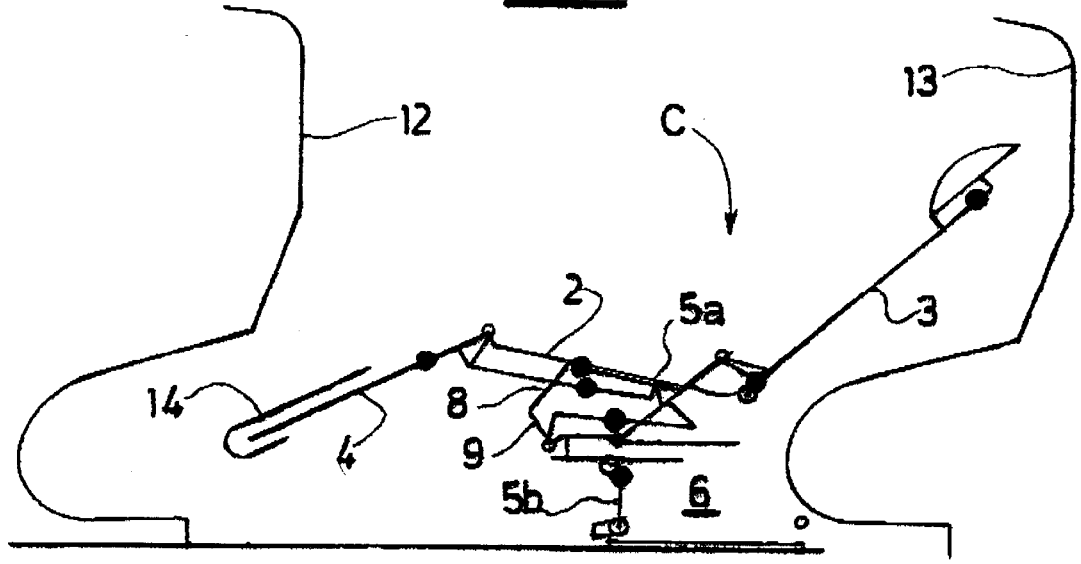
FIG. 4 is a schematic side representation of the seat in the position depicted in FIG. 1.

One embodiment of the seat 1 according to the invention is described with reference to FIG. 1.

The seat 1 comprises a squab 2, a backrest 3, a leg rest 4, a support structure 5 for the squab 2 and backrest 3 and a fixed separation shell 13 disposed behind the backrest 3 of the seat.

The squab 2, the backrest 3 and the leg rest 4 are each adjustable for inclination independently of each other.

The squab 2 is fixed rotatably on the backrest 3 about a rotation spindle 18. This spindle 18 is disposed on the bottom part of the backrest.

The leg rest 4 is adjustable for inclination with respect to the squab 2 by rotation about a spindle 7.

Figure 10:
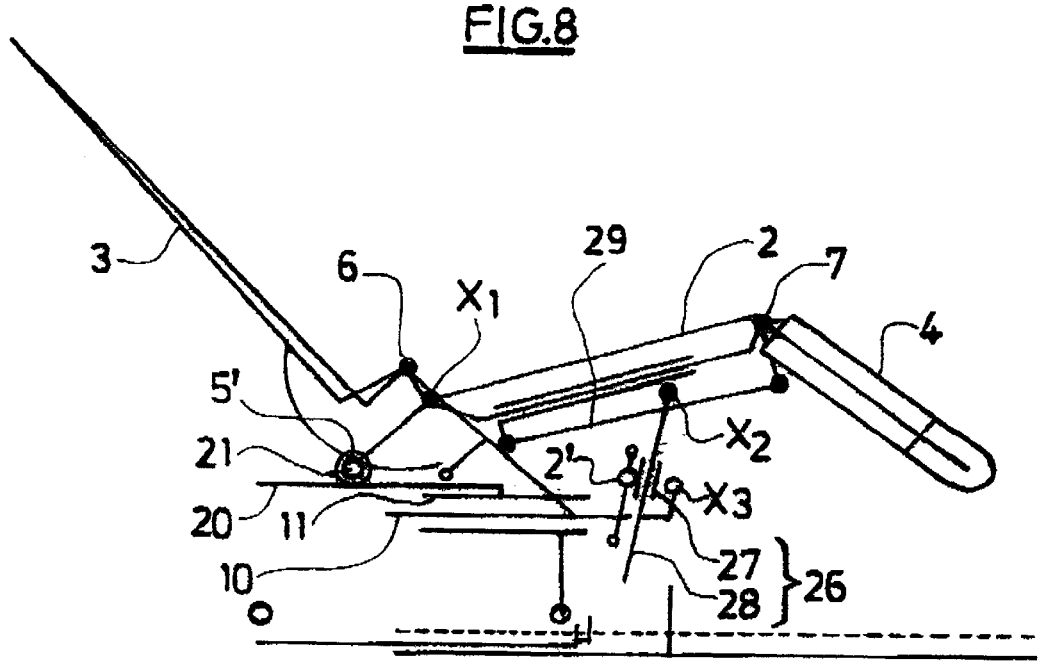
FIG. 10 is a schematic side representation of the seat in the position depicted in FIG. 9.
Figure 11:
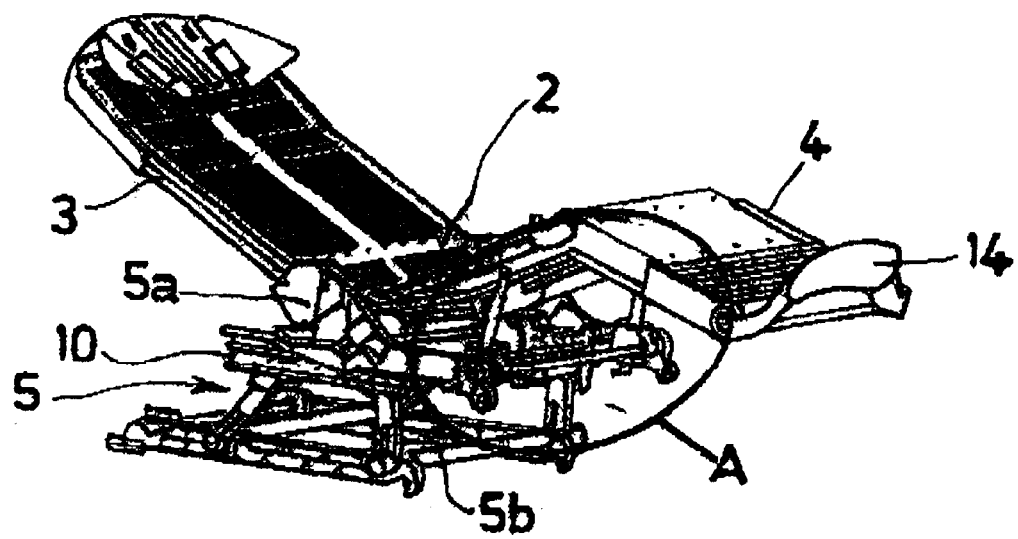
FIG. 11 is a perspective view of the means of articulating the squab and the leg rest of the seat depicted in FIG. 9.
Figure 11A:
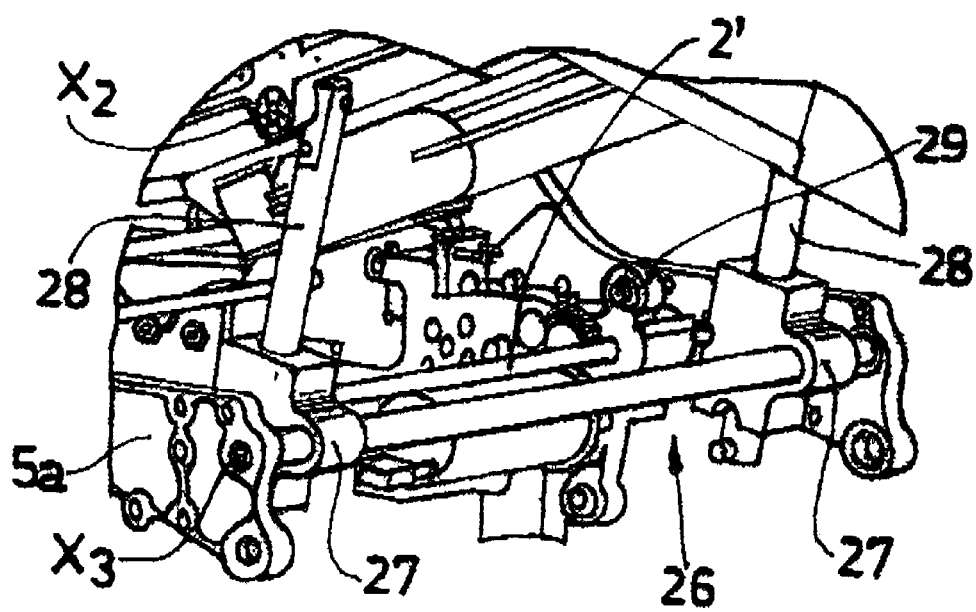
FIG. 11a is an enlargement of part A of FIG. 11.

In the embodiment depicted in FIGS. 9 to 12, the movement of the leg rest is actuated by an electric jack 29 in pivot connection with the squab 2 on the one hand and with the leg rest 4 on the other (FIG. 10).

The backrest 3 is adjustable for inclination with respect to the support structure 5 by rotation about a spindle 6.

According to the embodiment, the support structure 5 or the squab 2 are able to move in translation in a direction substantially perpendicular to the plane of the backrest 3 in the vertical position.

In the embodiment described below, only the support structure 5 is able to move in translation.

The support structure 5 can have two parts: a fixed bottom part 5b secured to the floor of the aircraft and a top part 5a.

The said top part 5a is able to move in translation with respect to the fixed bottom part 5b. This connection is for example effected by a system of runners 10, 11 disposed respectively at the bottom part 5b and the top part 5a in a substantially horizontal plane in a direction substantially perpendicular to the plane of the backrest 3 in the vertical position.

The runner system 10, 11 can be telescopic or not according to the movement travel. It is disposed on each side of the squab 2.

In the embodiment depicted in FIGS. 10, 12, 12a, the actuation of the movement of the runner 10, 11 is effected by means of racks 20 fixed to the bottom part 5b, on each side of the squab 2, and pinions 21 disposed on each side of the squab on a substantially horizontal spindle 5' mounted for pivoting on the top part 5a. The pinions 21 mesh in the racks 20 so as to move them.

An actuator 22 disposed on the spindle 5' drives the latter in rotation and consequently makes the pinions 21 turn, thus driving the translation of the racks 20.

The rotation spindle 6 for the backrest 3 is preferably situated on the top part 5a of the said support structure 5.

The backrest thus pivots with respect to the top part 5a about the spindle 6.

In the embodiment depicted in FIGS. 12, 12a, the actuation of the inclination of the backrest 3 is effected by gears comprising a wheel sector 23 and a pinion 24.

A wheel sector 23 is disposed on each side of the backrest and a shaft 6', substantially horizontal, fixed in a pivot connection on the top part 5a, carries a pinion 24 on each side of the backrest, each pinion 24 engaging with a wheel sector 23. The shaft 6' is driven by a rotary actuator 25.

This rotary actuator 25 drives the rotation of the shaft 6' and consequently of the pinions 24. The rotation of the pinions 24 then drives the rotation of the wheel sectors 23 and the inclination of the backrest 3.

The squab 2 is also connected to the top part 5a of the support structure 5. In this way, the squab 2 and the backrest 3 are moved in translation, integrally with the top part 5a of the support structure 5.

The adjustment of the inclination of the squab 2 is effected for example by a system of links 8, 9 articulated on each other, one 8 of the links being articulated on the squab 2 and the other link 9 being articulated on the support structure 5, preferably at the top part 5a of the latter (FIG. 1). These links 8, 9 are disposed on the side of the squab 2 opposite to the backrest 3, so that this side can be raised up compared with the other side.

In another embodiment depicted in FIGS. 9, 10, 11 and 11a, the adjustment of the inclination of the squab 2 is effected in the following manner:

the rear of the squab 2 is in pivot connection with the backrest 3 about a spindle X1 substantially parallel to the spindle 6 and situated at a distance from the latter. This offset between the spindles 6 and X1 makes it possible, when the backrest 3 tilts, for the front of the squab 2 to be raised whilst the rear of the squab 2 is lowered;

the front of the squab 2 is in connection with the top part 5a by means of a double jack 26. On each side of the squab, the double jack 26 is composed of a body 27 in pivot connection with the top part 5a through a spindle X3 and a rack 28 in pivot with the front of the squab by means of a spindle X2. The rack 28 is in runner connection with respect to the body 27 and is actuated by a rotary actuator 29 by means of a shaft 2' fixed for pivoting on the body 27. The ends of the shaft 2' each comprise a pinion in engagement with a rack 28. The movement of the rack 28 with respect to the body 27 thus makes it possible to modify the height of the front of the squab and the inclination thereof.

The spindles X1, X2 and X3 and the shaft 2' extend in a substantially horizontal direction.

Figure 8:
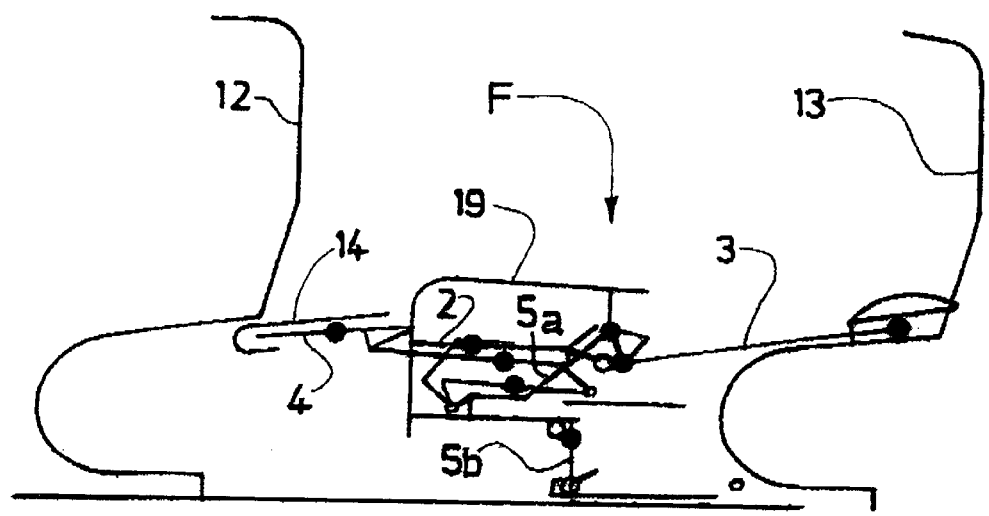
FIG. 8 is a schematic side representation of the seat in a reduced-length completely horizontal elongated position.

The seat can also have one or two arm rests 19 situated on each side of the seat 1 (FIG. 8). These arm rests can be individual and completely independent of the surrounding seats.

These arm rests 19 are fixed to the support structure 5. Preferably they are integral with the top part 5a of the said support structure 5, so that they can follow the movement of this part 5a and provide maximum comfort for the passenger.

The movements of the different components of the seat 1, namely the movements of the squab 2, of the backrest 3 and of the leg rest 4, are completely independent of each other.

The seat 1 can also have a foot rest 14 able to move in translation with respect to the leg rest 4, so that the total length of the leg rest 4 and foot rest 14 can be adjusted by the passenger in the space available. The movement of the foot rest 14 is independent of the other movements of the seat.

In other embodiments, other components of the seat can be movable, such as the arm rests or the head rest, or the length of the squab 2 can be adjusted to the size of the passenger, the different movements always remaining independent.

The seat 1 is situated in a space included between a fixed front separation shell 12 and a fixed rear separation shell 13 depicted in FIGS. 2 to 8.

These fixed separation shells 12, 13 are fixed and secured to the floor of the aircraft. They thus delimit a space in which the seat can be moved. The distance between two fixed shells 12, 13 is variable according to the distribution of the seats inside the aircraft.

These shells 12, 13 can notably serve as a shelf or video screen support for the passenger sitting behind them.

The squab 2, the backrest 3, the leg rest 4 and the support structure 5 are completely independent of the separation shells 12, 13. Their movements are independent of the said shells 12, 13.

In the space defined by two separation shells 12, 13, the seat 1 comprises control means enabling it to adopt, between a straight take-off and landing position of the seat and an elongated position of the seat, all the positions allowed by the space lying between the said fixed front separation shell 12 and the said fixed rear separation shell 13.

Some of these positions are described in FIGS. 2 to 8. In these figures, the same symbols are represented by the same references.

FIG. 2 describes the seat 1 in the straight take-off and landing position A. The squab 2 is substantially horizontal, the backrest 3 and the leg rest 4 being substantially vertical.

In this position A, the said seat 1 extends close to the fixed rear separation shell 13.

When the two front 12 and rear 13 shells are very far away from each other, in the take-off position A, the passenger cannot use any equipment disposed in the separation shell 12 since this is too far away.

The seat 1 can then be placed in a straight position B situated at a distance from the said fixed rear separation shell 13, in which the squab 2 is substantially horizontal, the backrest 3 and the leg rest 4 being substantially vertical. This position B is depicted in FIG. 3.

The seat is then close to the fixed front separation shell 12 and the passenger can use the equipment disposed on the latter.

In one embodiment, each fixed separation shell 13 of a seat comprises a separation element 30 forming a hood for increasing the isolation of the passenger (FIG. 13).

This separation element 30 is in the form of a hood extending the top part and the sides of the fixed shell 13.

This separation element 30 is able to move between a position in which it is retracted inside the fixed shell 13 and a position in which it projects from the fixed shell 13.

The separation element 30 comprises a top part forming a roof 31, narrow and thin, substantially in the form of an arc of a circle, each end of which is extended by an upright 32, the shape of the parts 31 and 32 matching the internal shape of the fixed separation shell 13.

The bottom end of each upright 32 is connected on the one hand to the end of a lever 34 by a fixed connection on the side of the upright situated toward the front of the fixed shell 13, and on the other hand to the end of a link 35 by a pivot connection 36 on the side of the upright situated toward the rear of the fixed shell 13.

The other end of the lever 34 comprises a rack 37.

The other end of the link 35 is connected to the lever 34 by a pivot connection situated substantially half way up the lever.

A wheel sector 37 of each lever 34 meshes on a pinion 38 on a shaft 39.

The shaft 39, substantially horizontal, is disposed in the bottom part of the fixed shell 13. It is driven in rotation by an actuator 40.

Thus the pinions 38 driven in rotation by the shaft 39 in their turn drive the movement of the wheel sectors 37 causing the tilting of the levers 34 and causing the separation element 30 to move out of or retract into the fixed shell 13.

FIGS. 1 and 4 depict the seat 1 in a comfort position C in which the backrest 3 is inclined towards the rear with respect to the vertical, the squab 2 is inclined with respect to a horizontal plane, the part of the squab 2 distant from the backrest 3 thus being raised up, and the leg rest 4 is slightly inclined with respect to the vertical so that it is inclined downwards with respect to the squab 2.

Figure 5:
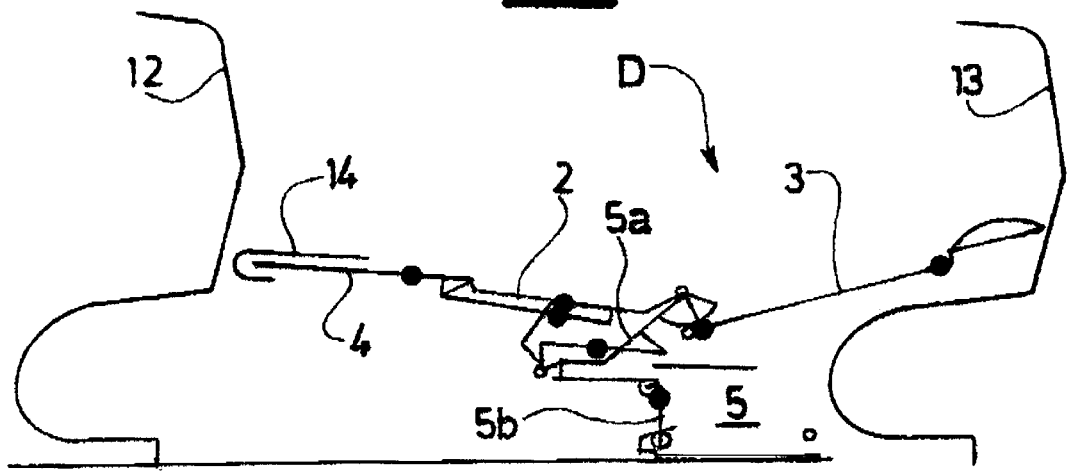
FIG. 5 is a schematic side representation of the seat in a position substantially in a V shape.

FIG. 5 depicts the seat 1 in a position D substantially in a V shape.

In this position D, the backrest 3 is inclined towards the rear with respect to the vertical, the squab 2 and the leg rest 4 being in the same plane inclined upwards with respect to the horizontal. The passenger thus has his legs raised.

FIG. 6 depicts the seat 1 in a substantially elongated position E in which the backrest 3, the squab 2 and the leg rest 4 are situated in the same plane slightly inclined with respect to the horizontal plane.

FIGS. 7 and 8 depict the seat 1 in a completely elongated position F, the backrest 3, the squab 2 and the leg rest 4 being situated in the horizontal plane.

When the seat 1 has a foot rest 14, the total length of the seat in the position F may be variable.

The position F can then be of maximum length as depicted in FIG. 7, the foot rest 14 being completely deployed. The passenger can then stretch out completely.

The position F can also be of reduced length, as depicted in FIG. 8, the foot rest 14 not being at all deployed or being partially deployed. The passenger can then lie in a "curled up" position.

Apart from these positions A to F, the seat 1 can adopt all the intermediate positions or all the positions having variants given that the movements of the backrest 3, the squab 2 and the leg rest 4 are independent.

In any position of the seat 1, if the distance between the two front 12 and rear 13 separation shells is small, the top part 5a of the support structure 5 is then moved in translation with respect to the bottom part 5b of the support structure 5 in order to avoid the backrest 3 and/or the leg rest 4 coming into contact with one of the two separation shells 12, 13.

If this distance between the two front 12 and rear 13 separation shells is too small, it may happen that the completely elongated position F with the foot rest 14 completely deployed is impossible. The passenger can then put the seat 1 in the inclined elongated position E or reduce the length of the foot rest 14.

The extension of the foot rest 14 can also be adjusted in any position of the seat.

In order to change from one position to another, the seat 1 comprises control means.

These control means comprise independent motors 15, the movement of each component 2, 3, 4, 13 of the seat being controlled by at least one of the said motors 15.

Provision can also be made for the movements of the foot rest 14 and/or of the headrest and/or possibly of other movable components of the seat to be controlled by at least one of the said motors 15.

Provision can notably be made for the control means to comprise an electronic control box 16 cooperating with the said motors 15 and also cooperating with means 17 which can be actuated by the user in order to adjust the position of the seat (FIG. 7).

The said motors 15 can be the actuators 22, 25, 29, 40 described above.

This electronic control box 16 can be programmable.

These means 17 are for example a series of control buttons or levers for controlling the movement of the different movable components of the seat 1.

When the distance between two separation shells 12, 13 varies from one seat installation to another, the limitations for avoiding interference with the surroundings of the seat are effected solely by restrictions on the motor drive, the control means remaining identical.

It is thus possible to define an envelope delimiting the movements of the seat allowed by the restrictions on the motor drive. This envelope is defined by at least two extreme points of the seat 1, such as the end of the leg rest 4 or of the foot rest 14 when present and the end of the head rest.

The restrictions on the motor drive are such that the envelope does not interfere with the surroundings of the seat such as the separation shells 12, 13 and possibly the floor of the aircraft in order to avoid damaging the leg rest 4 or foot rest 14.

The adjustment of the extreme movements of the different movable components of the seat 2, 3, 4, 14 according to the shape and/or the distance between the two separation shells 12, 13 is effected simply by adjusting the control box 16 and/or the motors 15, without modification to any components of the structure of the seat or the kinematics.

These motors are for example each slaved, with position copying, to a programmable control box 16. By modifying the programming of these boxes 16, the envelope of the permitted movements of the seat is varied according to the shape and/or the relative position of the separation shells 12, 13.

It is also possible to place stops for limiting the different movements. Other equivalent means can also be used for limiting the movements.

The seats can thus be easily transposed from one installation to another without significant modifications.

The invention is not limited to the embodiment described. It can notably be envisaged that the backrest 3 be connected to the squab 2, the latter being connected to the support structure 5.

When the seat according to the invention comprises two arm rests 19, and the latter are individual, the seat then forms a unit which is completely independent of the surrounding seats, the various places being independent.

The seat according to the invention can in particular be used in other air, land or sea transport vehicles without departing from the scope of the invention.

What is claimed is:

1. A seat (1) for an aircraft comprising
a squab (2) adjustable for inclination;
a backrest (3) adjustable for inclination;
a leg rest (4) adjustable for inclination;
a support structure (5) for supporting the squab (2) and backrest (3), the support structure (5) of the squab (2)

having a fixed bottom part (5b) adapted to be secured to a floor of the aircraft, and a top part (5a) able to move in translation with respect to the bottom part (5b) by way of substantially horizontal runners (10, 11);

a fixed rear separation shell (13) disposed behind the backrest (3), the support structure (5) or the squab (2) being able to move in translation in a direction substantially perpendicular to the backrest (3) in a vertical position, said seat (1) being situated in a space lying between a fixed front separation shell (12) and the fixed rear separation shell (13), and said seat extending close to the fixed rear separation shell (13) in a straight take-off and landing position (A) in which the squab (2) is substantially horizontal and the backrest (3) and the leg rest (4) being substantially vertical, wherein the movements of each of the squab (2), the backrest (3), and the leg rest (4) are independent of each other and the fixed front separation shell (12) and the fixed rear separation shell (13);

control means for enabling the seat (1) to adopt all positions between the straight takeoff and landing position (A) and an elongated position (E, F), wherein all positions of the seat are constrained by the space between the fixed front separation shell (12) and the said fixed rear separation shell (13);

a first spindle (X1) substantially parallel to and at a distance from a second spindle (6) serving as a pivot connection between the rear of the squab (2) and the backrest (3);

a double jack (26) connecting the top part (5a) of the support structure and the front of the squab (2), the double jack (26) comprising, on each side of the squab (2), a body (27) in pivot connection with the ton part (5a) through a third substantially horizontal spindle (X3) and a rack (28) in pivot connection with the front of the squab through a substantially horizontal spindle (X2); and a rotary actuator (29) comprising a substantially horizontal shaft (2') fixed in pivot connection to the body (27), the ends of the shaft (2') engaging each rack (28), the rotary actuator (29) driving the rotation of the shaft (2') and driving the translation of the rack (28) so that the movement of the rack (28) with respect to the body (27) allow modification of the height of the front of the squab (2) and the inclination thereof.

2. A seat according to claim 1, wherein the seat can adopt a straight position (B) situated at a distance from the said fixed rear separation shell (13), in which the squab (2) is substantially horizontal, and the backrest (3) and leg rest (4) are substantially vertical.

3. A seat according to claim 1, wherein the seat can adopt a position (D) substantially in a V shape, the backrest (3) being inclined towards the rear with respect to the vertical, the squab (2) and the leg rest (4) being in the same plane inclined upwards with respect to the horizontal.

4. A seat according to claim 1, wherein the seat can adopt a position (C) in which the backrest (3) is inclined towards the rear with respect to the vertical, the squab (2) is inclined with respect to the horizontal and the leg rest (4) is inclined downwards with respect to the squab (2).

5. A seat according to claim 1, wherein the seat can adopt a completely elongated position (F), and in which the backrest (3), the squab (2) and the leg rest (4) are situated in the horizontal plane.

6. A seat according to claim 1, wherein the seat can adopt a substantially elongated position (E) in which the backrest (3), the squab (2) and the leg rest (4) are situated in the same plane slightly inclined with respect to the horizontal plane.

7. A seat according to claim 1, wherein the seat further comprises:

racks (20) fixed to the bottom part (5b) of each side of the squab (2);

pinions (21) disposed on each side of the squab on a shaft (5') mounted so as to pivot on the top part (5a) intended to mesh with the racks (20); and an actuator (22) disposed on the shaft (5'), the actuator (22) driving the shaft (5') and the pinions (21) in rotation, the pinions (21) driving the racks (20) in translation.

8. A seat according to claim 1, wherein the seat further comprises:

a wheel sector (23) disposed on each side of the back rest (3);

a substantially horizontal shaft (6') fixed in pivot connection to the top part (5a) of the squab and carrying a pinion (24) on each side of the backrest (3); and a rotary actuator (25);

each pinion (24) coming into engagement with a wheel sector (23), the actuator (25) driving in rotation the shaft (6'), the pinions (24) and the wheel sectors (23).

9. A seat according to claim 1, wherein the seat further comprises two individual arm rests (19).

10. A seat according to claim 9, wherein the two arm rests (19) are secured to the top part (5a) of the support structure (5).

11. A seat according to claim 1, wherein the seat further comprises a foot rest (14) able to move in translation with respect to the leg rest (4).

12. A seat according to claim 11, wherein the total length of the seat in a completely elongated position (F) is variable according to the extension of the foot rest (14).

13. A seat according to claim 11, wherein the control means comprises an independent motor (15) for controlling the movement of the foot rest (14).

14. A seat according to claim 1, wherein the fixed rear separation shell (13) of the seat comprises a separation element forming a hood (30) extending along the top part and the sides of the said fixed rear separation shell (13), and in which the seat is able to move between a position in which it the seat is retracted inside the fixed rear separation shell (13) and a position in which the seat projects therefrom.

15. A seat according to claim 14, wherein the separation element (30) comprises uprights (32), the bottom ends of which (33) are each connected to the end of a lever (34) by a fixed connection on the side of the upright (32) situated towards the front of the fixed shell (13) and to the end of a link (35) by a pivot connection (36) on the side of the upright situated towards the rear of the fixed shell (13), the other end of the lever (34) comprising a wheel sector (37) meshing on a pinion (38) on a shaft (39), the shaft (39) being driven in rotation by an actuator (40).

16. A seat according to claim 1, wherein the control means enabling the seat to adopt the various positions comprises independent motors (15), the movement of each of the squab (2), the backrest (3), and the leg rest (4) being controlled by at least one of the motors (15).

17. A seat according to claim 16, wherein the control means comprises an electronic control box (16) cooperating with being able to be actuated by a user in order to adjust the position of the seat (1).

18. A seat according to claim 17, wherein the adjustment of the movements of the squab (2), the backrest (3), the leg rest (4), and the foot rest (14) is effected by adjusting the control box (16) and/or the motors (15).

19. A seat according to claim 1, wherein the seat further comprises an electric jack (29) in pivot connection with the squab (2) on one side and with the leg rest (4) on the other, intended to actuate the movement of the leg rest.

* * * * *